United States Patent [19]
Bridges et al.

[11] Patent Number: 5,535,352
[45] Date of Patent: Jul. 9, 1996

[54] ACCESS HINTS FOR INPUT/OUTPUT ADDRESS TRANSLATION MECHANISMS

[75] Inventors: K. Monroe Bridges, Fremont; Robert Brooks, Roseville; William R. Bryg, Saratoga; Stephen G. Burger, Santa Clara; Eric W. Hamilton, Mountain View; Helen Nusbaum, Sacramento; Brendan A. Voge, Granite Bay, all of Calif.; Michael L. Ziegler, Whitinsville, Mass.

[73] Assignee: Hewlett-Packard Company, Palo Alto, Calif.

[21] Appl. No.: 217,587

[22] Filed: Mar. 24, 1994

[51] Int. Cl.$^6$ .............................. G06F 12/10; G06F 13/00
[52] U.S. Cl. .......................... 395/418; 395/416; 395/823; 395/846
[58] Field of Search ..................................... 395/275, 400, 395/425, 403, 416, 418, 468, 471, 472, 823, 846

[56] References Cited

U.S. PATENT DOCUMENTS

| | | | |
|---|---|---|---|
| 4,155,119 | 5/1979 | DeWard et al. | 395/400 |
| 4,403,282 | 9/1983 | Holberger et al. | 395/275 |
| 4,525,778 | 6/1985 | Cane | 395/425 |
| 4,574,346 | 3/1986 | Hartung | 395/425 |
| 4,669,043 | 5/1987 | Kaplinsky | 395/400 |
| 4,928,239 | 5/1990 | Baum et al. | 395/425 |
| 5,263,140 | 11/1993 | Riordan | 395/400 |
| 5,301,287 | 4/1994 | Herrell et al. | 395/400 |
| 5,301,302 | 4/1994 | Blackard et al. | 395/500 X |
| 5,347,636 | 9/1994 | Ooi et al. | 395/275 |
| 5,426,750 | 6/1995 | Becker et al. | 395/400 |

*Primary Examiner*—Jack A. Lane

[57] ABSTRACT

A computing system includes a main memory and an input/output adapter. The input/output adapter accesses a translation map. The translation map maps input/output page numbers to memory address page numbers. Entries to the translation map are generated so that each entry includes an address of a data page in the main memory and transaction configuration information. The transaction configuration information is utilized by the input/output adapter during data transactions to and from the data page.

9 Claims, 7 Drawing Sheets

ACCESS HINTS FOR INPUT/OUTPUT ADDRESS TRANSLATION MECHANISMS

BACKGROUND

The present invention concerns the use of access hints for input/output address translation mechanisms.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor.

In addition to using a cache memory to retrieve data from main memory, the CPU may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory. A data block which is overwritten or copied out of cache memory when new data is placed in the cache memory is called a victim block or a victim line.

For further related information on cache memories, see U.S. Pat. No. 4,928,239 issued on May 22, 1990 to Allen Baum, et al., for *Cache Memory with Variable Fetch and Replacement Schemes.*

Input/output (I/O) adapters which interact with memory need to be designed to integrate with all features of the computing system. To this end, address translation maps within the I/O adapters are often used to convert I/O bus addresses to memory addresses. Such address translation maps have been used when the I/O bus address range is smaller than the memory address range, so that I/O accesses can reference any part of memory.

In the prior art, I/O address translation maps have been managed by software. Each entry in the address translation map is explicitly allocated and loaded by operating system software. When an I/O adapter accesses the main memory in a system where one or more processors utilizes a cache, it is necessary to take steps to insure the integrity of data accessed in memory. For example, when the I/O adapter accesses (writes or reads) data from memory, it is important to determine whether an updated version of the data resides in the cache of a processor on the system. If an updated version of the data exists, something must be done to insure that the I/O adapter accesses the updated version of the data. An operation that assures that the updated version of the data is utilized in a memory references is referred to herein as a coherence operation.

Various schemes have been suggested to insure coherence of data accessed by an I/O adapter from the system memory. For example, previous schemes have included software explicitly flushing caches prior to performing I/O operations.

When designing an I/O adapter, it is necessary to analyze the computing system to assure the I/O adapter is optimized for the computing system. Some I/O buses require that data transactions be atomic. That is, other transactions need to be "locked out" during atomic data transactions. An I/O adapter which interfaces with such an I/O bus needs to be able to implement this feature. However, when an I/O adapter performs atomic transactions, this slows down system performance.

Likewise, when data is stored sequentially, it is an advantage if the I/O adapter pre-fetches data when reading from memory and to coalesce data when writing to memory. Pre-fetching means fetching data before a request for the data is actually made. Generally, data is selected for prefetch because it sequentially follows data that is actually accessed. Coalescing is used when data arrives from the I/O bus in units which are smaller than the units which can be transferred onto the memory bus. For example, coalescing can be used for blocks which are smaller than a cache line. Data transfer is made more efficient by coalescing the blocks received from the I/O bus into a cache line before forwarding the entire cache line over the memory bus to the memory. When data is not stored sequentially, such prefetching and coalescing can be a hindrance to system performance.

Sometimes it is an advantage on data transactions to invalidate all corresponding data in system caches. Other times, it is preferable to update cache on writes or cleanse cache data on reads. Further, for systems in which data is aligned on cache line boundaries, "fast" DMA can be performed relying on the alignment. However, for systems in which data is not aligned on cache line boundaries, it is necessary to perform a slower "safe" DMA.

When an I/O adapter is designed to facilitate a number of different uses within a computing system, it is desirable for the I/O adapter to run optimally with each usage and when performing all types of data transactions. Such a versatile I/O adapter is not found in the prior art.

SUMMARY OF THE INVENTION

In accordance with the preferred embodiment of the present invention, a computing system is presented which includes a main memory and an input/output adapter. The input/output adapter accesses a translation map. The translation map maps input/output page numbers to memory address page numbers. Entries to the translation map are generated so that each entry includes an address of a data page in the main memory and transaction configuration information. The transaction configuration information is utilized by the input/output adapter during data transactions to and from the data page to optimize performance.

For example, the transaction configuration information for each entry includes an indicator indicating whether data within the data page is sequential. Before the input/output adapter performs a data transaction to the data page, the indicator is checked to determine whether data within the data page is sequential. When it is determined that data within the data page is sequential, additional data is prefetched into the input/output adapter during data reads of data from the data page. Additionally, data is coalesced into cache lines by the input/output adapter during data writes of data to the data page.

Additionally, the transaction configuration information for each entry can include an indicator indicating whether corresponding data in the cache is to be invalidated after input/output adapter reads data from or writes data to the data page in main memory. Before the input/output adapter performs a data transaction to the data page, this indicator is checked to determine whether corresponding data in the cache is to be invalidated after input/output adapter writes data to the data page in main memory. When it is determined that corresponding data in the cache is to be invalidated after input/output adapter writes data to the data page in main memory, corresponding data in the cache is invalidated during data writes of data to the data page. When it is determined that corresponding data in the cache is not to be invalidated after input/output adapter writes data to the data page in main memory, corresponding data in the cache is updated during data writes of data to the data page. Additionally, corresponding data in the cache is cleansed from the cache during data reads of data from the data page.

Also, the transaction configuration information for each entry can include an indicator indicating whether data within the data page is aligned along cache line boundaries. Before the input/output adapter performs a DMA data transaction to the data page, this indicator is checked to determine whether data within the data page is aligned along cache line boundaries. This alignment includes the case where software "pads" the ends of each buffer to the next cache line boundary. When it is determined that data within the data page is aligned along cache line boundaries, a fast DMA transaction is performed. When it is determined that data within the data page is not aligned along cache line boundaries, a safe DMA transaction is performed. For example, when performing a fast DMA write of a block of data to a first address in memory, a write invalidate or a write update is performed even if data for the full cache line is not available.

When performing a safe DMA, a full cache line which contains old data for the first address is read by the input/output adapter, modified by replacing the old data with the block of data, and then written back to the memory and (in some embodiments) the cache. The safe DMA prevents destruction of "dirty" information which may be in the cache line in addition to the old data. In the fast DMA, because the data page is aligned along cache line boundaries, there is no need to worry about destroying such dirty information.

The transaction configuration information for each entry can also include an indicator indicating whether the input/output adapter locks out other transactions to main memory when the input/output adapter reads data from the data page in main memory and when the input/output adapter writes data to the data page in main memory. Before the input/output adapter performs a data transaction to the data page, this indicator is checked to determine whether the input/output adapter locks out other transactions to main memory when the input/output adapter reads data from the data page in main memory and when the input/output adapter writes data to the data page in main memory. When it is determined that the input/output adapter locks out other transactions to main memory when the input/output adapter reads data from the data page in main memory and when the input/output adapter writes data to the data page in main memory, other transactions to main memory are locked out when the input/output adapter reads data from the data page in main memory and when the input/output adapter writes data to the data page in main memory. The input/output adapter can continue to lock out transactions to main memory while input/output adapter performs additional locked transactions until the input/output adapter encounters an unlocked transaction.

The preferred embodiment of the present invention allows data transactions for each memory page to be configured by storing indicators in the translation map with the entry for each page address. This provides for efficient transfer of data between an input/output adapter and memory.

DESCRIPTION OF THE PREFERRED EMBODIMENT

Figure 1:
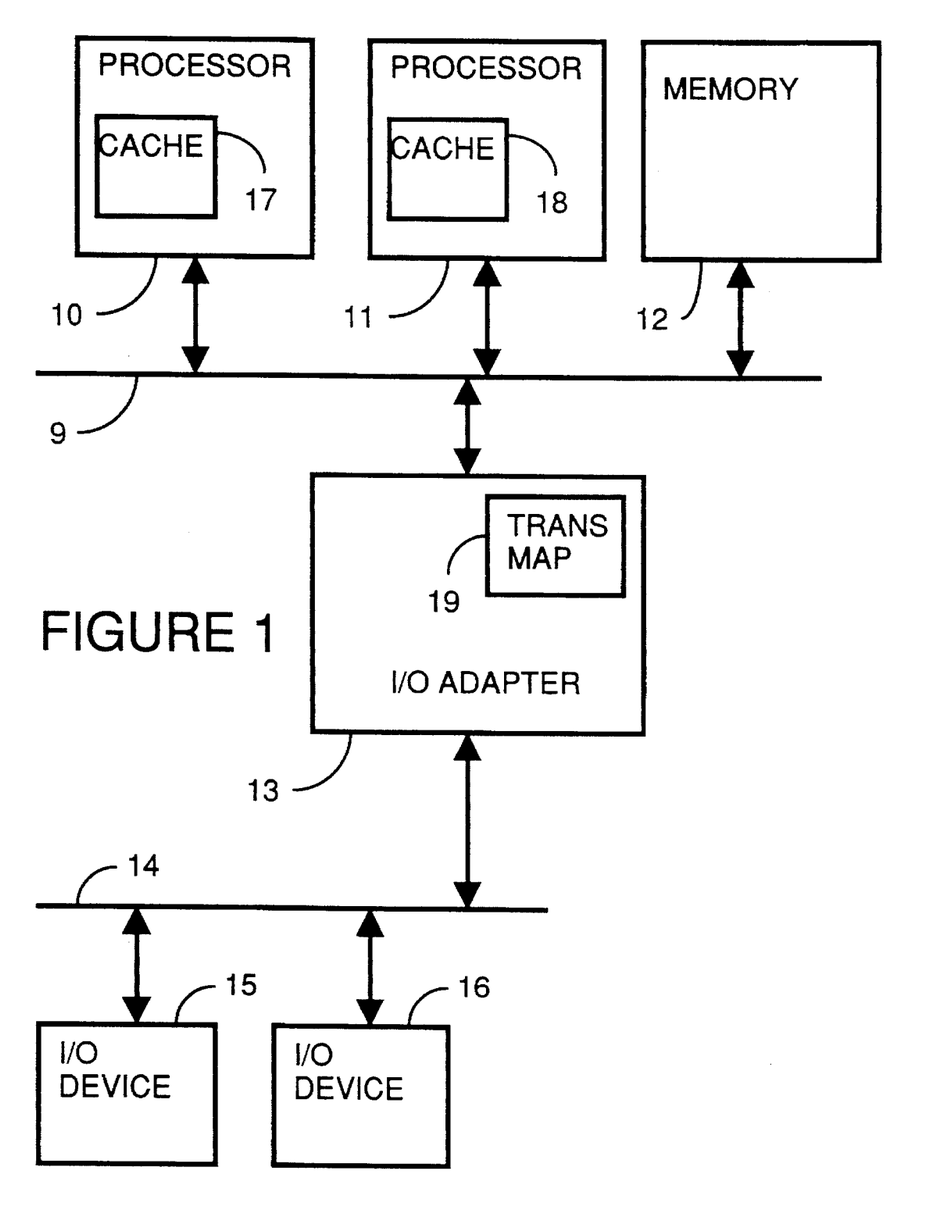
FIG. 1 shows a simplified block diagram of a computer system with an input/output (I/O) adapter in accordance with the preferred embodiment of the present invention.

FIG. 1 shows a simplified block diagram of a computer system. A processor 10, a processor 11 and a memory 12 are shown connected to a memory bus 9. Processor 10 utilizes a data cache 17. Processor 11 utilizes a data cache 18. Also connected to memory bus 9 is an input/output (I/O) adapter 13. I/O adapter 13 is connected to an I/O bus 14. Also connected to I/O bus 14 are an I/O device 15 and an I/O device 16. A translation map 19 is used to convert addresses used for I/O bus 14 to addresses used by memory 12.

Figure 2:
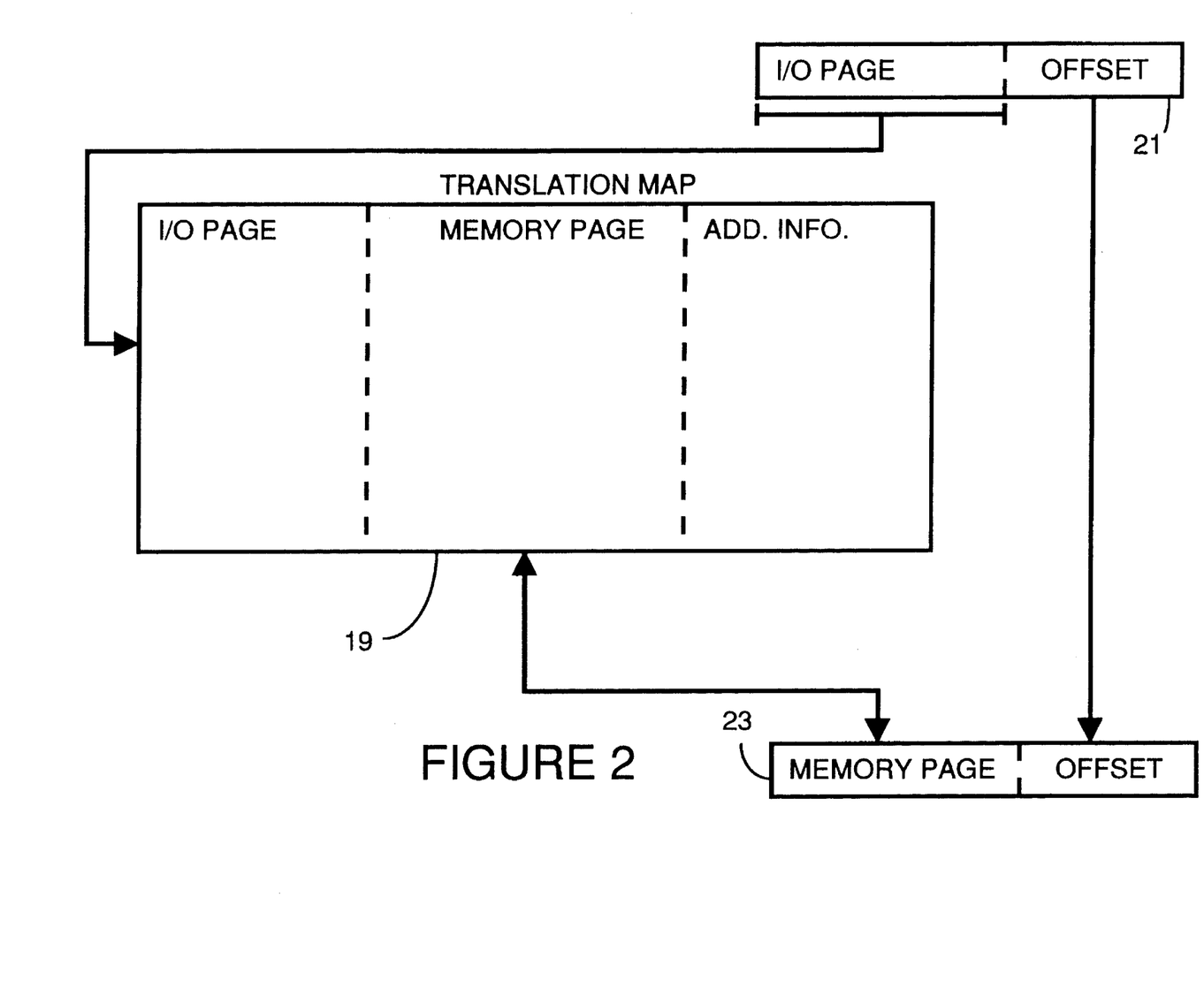
FIG. 2 shows an implementation of a translation map accessed by the I/O adapter shown in FIG. 1, in accordance with the preferred embodiment of the present invention.

FIG. 2 shows implementation of translation map 19 in accordance with the preferred embodiment of the present invention. Translation map 19 is used to translate an I/O bus address 21 to a memory address 23.

In the preferred embodiment, during a translation, an I/O page address is used to access a corresponding memory page within translation map 19. In the embodiment shown in FIG. 2, the I/O page number is used as an index into translation map 19. The I/O address offset is the same as the memory address offset. For example, in the preferred embodiment, I/O bus 14 utilizes thirty-two bit addresses, each address having a twenty bit I/O page number and a twelve bit offset. Memory bus 9 utilizes forty bit addresses, each address having a twenty-eight bit memory page number and a twelve bit offset.

In the preferred embodiment, for each memory page, translation map 19 also includes a coherence index. The coherence index is a portion derived from a virtual address and used to index cache 17 within processor 10 and cache 18 within processor 11. When the coherence index is passed as part of a memory access transaction, it allows processors 10 and 11 to easily look up information in cache 17 and 18, respectively, for potential coherency conflicts. Operating system software running on processor 10 or processor 11, loads address translation information into translation map 19 accessed by I/O adapter 13. This information includes the coherence index and other fields as described below.

Figure 3:
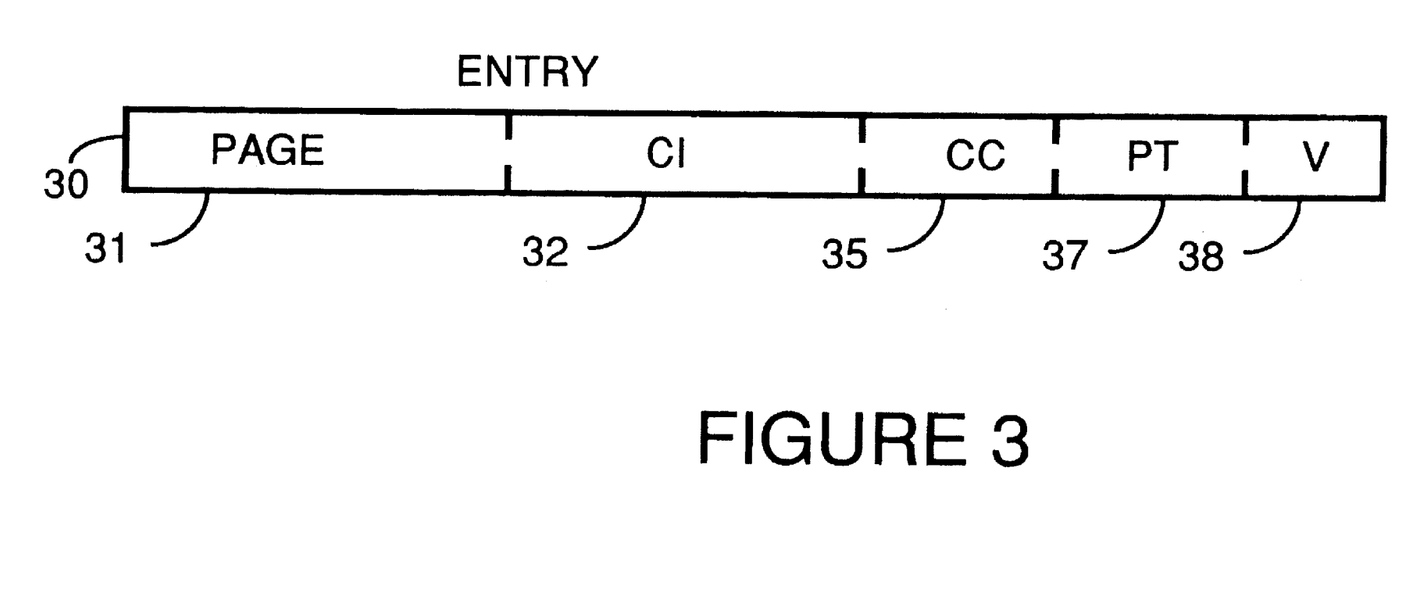
FIG. 3 shows the format of an entry in the translation map shown in FIG. 2, in accordance with the preferred embodiment of the present invention.

FIG. 3 shows the format of an entry 30 in translation map 19 in accordance with the preferred embodiment of the present invention. A page field 31 of entry 30 contains the forty bits of the physical page number of an address in memory 12. A coherence index (CI) field 32 of entry 30 contains a twelve bit coherency index of the physical page number of an address in memory 12. A cache control hints (CC) field 35 contains two bits of cache control hints. A page type (PT) field 37 contains two bits of page type. A valid indicator (V) field 38 contains a one bit valid indicator. Each bit in cache control hints field 35 and page type field 37 serves as an indicator which provides page by page "configuration" of data transactions between I/O adapter 13 and memory 12.

A first bit in page type (PT) field 37 indicates whether locking is enabled. When locking is enabled, I/O devices connected to I/O bus 14, such as I/O device 15 and I/O device 16, can lock main memory 12 for several transactions, to perform an atomic sequence. Locking is sometimes required when I/O bus 14, or another I/O bus connected to I/O bus 14, requires locking during memory transactions. However, locking memory degrades system performance, so locking is enabled only on those pages that require the capability. Operating system software running on processor 10 or processor 11, when loading address translation information into translation map 19 within I/O adapter 13, places a value in page type field 37 which indicates whether locking for the corresponding page is enabled.

Figure 4:
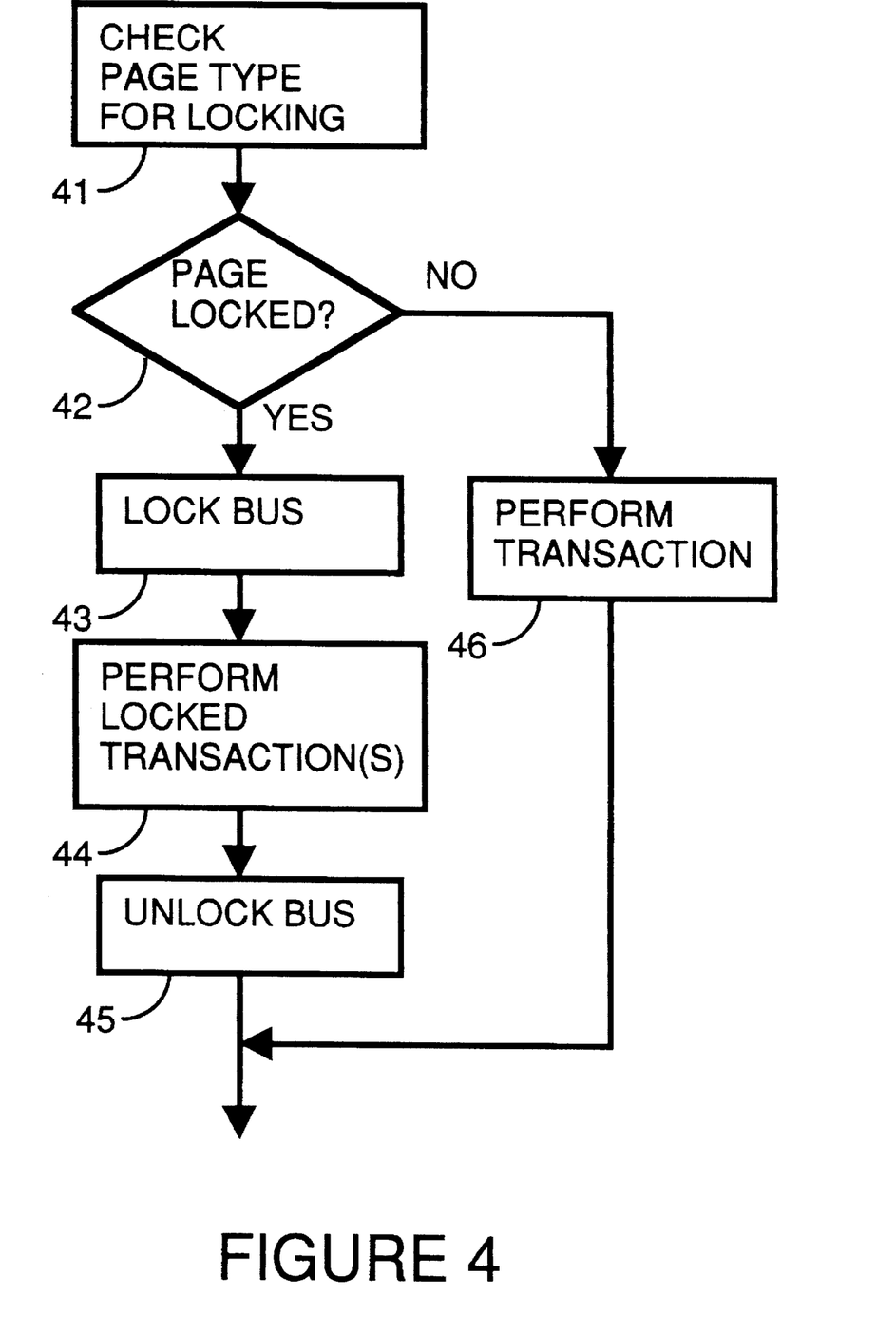
FIG. 4 is a flowchart which demonstrates how a locking indicator in the translation map affects performance of an I/O adapter during a data transaction in accordance with a preferred embodiment of the present invention.

FIG. 4 demonstrates how the locking bit in page type field 37 affects operation of I/O adapter 13 on a data transaction. When I/O adapter 13 performs a data transaction, I/O adapter 13, in a step 41 and a step 42, checks page type field 37 to determine whether the first bit of page type field 37 is set to logic one, indicating locking. If the page is not locked, in a step 46, the data transaction is performed. If the page is locked, in a step 43, I/O adapter 13 will lock out transactions to memory 12. In a step 44, locked data transactions are performed until I/O adapter 13 detects the next data transaction is an unlocked data transaction. When I/O adapter 13 detects the next data transaction is an unlocked data transaction I/O adapter will proceed to a step 45. In step 45, I/O adapter 13 will unlock transactions to memory 12.

A second bit in page type (PT) field 37 indicates what type of direct memory access (DMA) transactions are to be used. For a first value of the second bit in page type field 37, the DMA type is "fast". For fast DMA type, I/O adapter 13 assumes that data for I/O access of the page is aligned on cache line boundaries, including the case where software "pads" the ends of each buffer to the next cache line boundary. For a second value of the second bit in page type field 37, the DMA type is "safe". For safe DMA type, I/O adapter 13 does not assume that data for I/O access of the page is aligned on cache line boundaries. For example, when performing a fast DMA write of a block of data to a first address in memory, a write invalidate or a write update is performed on a full cache line which contains old data for the first address. When performing a safe DMA, a full cache line which contains old data for the first address is read by the input/output adapter, modified by replacing the old data with the block of data, and then written back to the memory and (in some embodiments) the cache. The safe DMA prevents destruction of "dirty" information which may be in the cache line in addition the old data. In the fast DMA, because the data page is aligned along cache line boundaries, there is no need to worry about destroying such dirty information.

Figure 5:
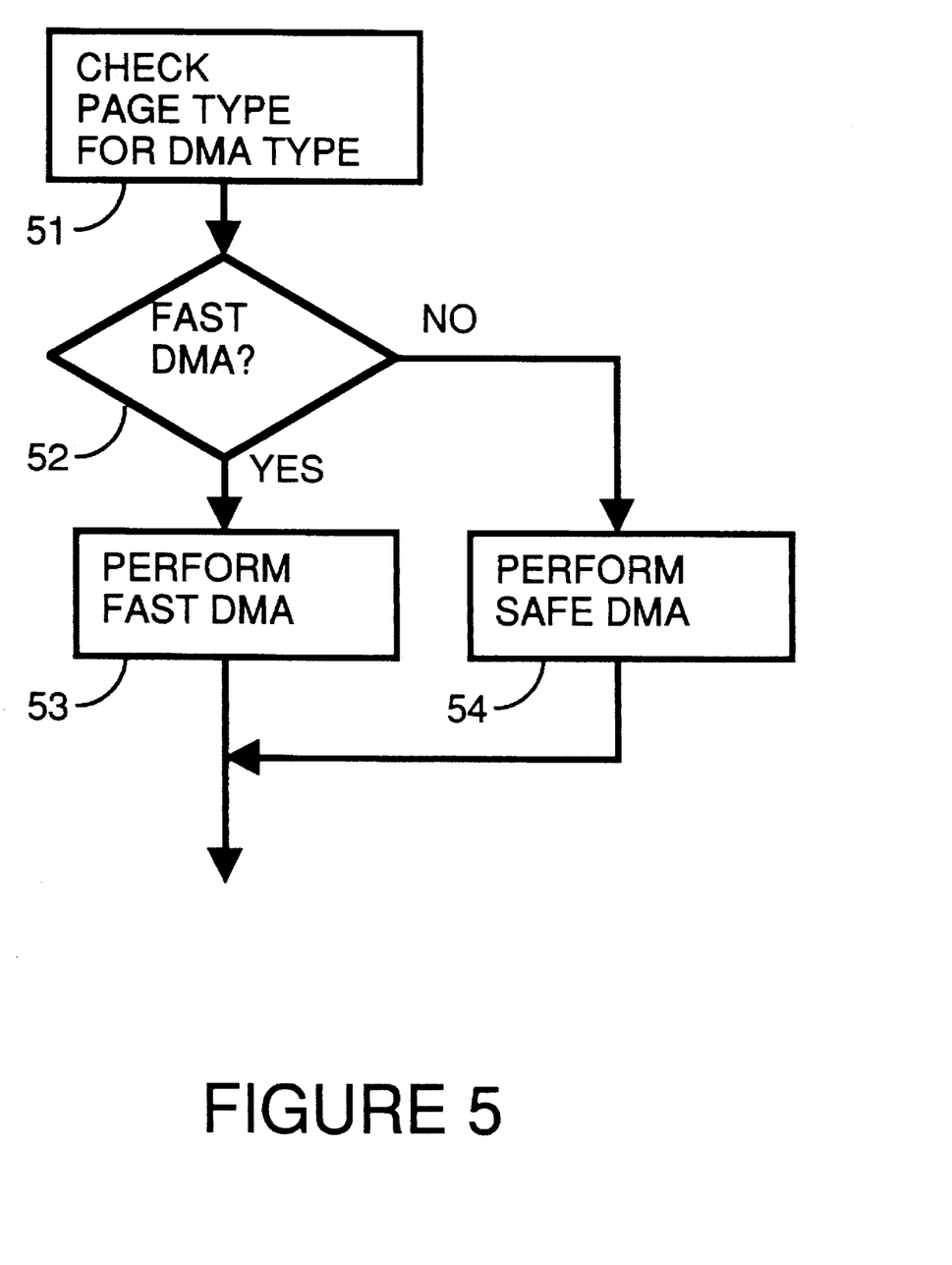
FIG. 5 is a flowchart which demonstrates how a DMA type indicator in the translation map affects performance of an I/O adapter during a data transaction in accordance with a preferred embodiment of the present invention.

FIG. 5 demonstrates how the second bit in page type field 37 affects performance of I/O adapter 13 on a data transaction. When I/O adapter 13 performs a data transaction, I/O adapter 13, in a step 51 and a step 52, checks page type field 37 to determine whether the second bit of page type field 37 is cleared to logic zero, indicating fast DMA is to be performed. If fast DMA is indicated, in a step 53, a fast DMA transaction is performed. If safe DMA is indicated, in a step 54, a safe DMA transaction is performed.

Table 1 below summarizes the page types indicated by page type field 37.

TABLE 1

| Value in field 37 | Page Type |
| --- | --- |
| 00 | Fast DMA/No Locks |
| 01 | Safe DMA/No Locks |
| 10 | Fast DMA/Locks Enabled |
| 11 | Safe DMA/Locks Enabled |

A first bit in cache control hints (CC) field 35 indicates whether the page contains sequential or non-sequential data. When the page contains sequential data, accesses will be monotonically increasing. Therefore when I/O adapter 13 is reading data from memory 12 and sending the data out to I/O bus 14, system performance will be improved by prefetching additional data from memory 12. Likewise, when the cache control hints field 35 indicates a page contains sequential data, I/O adapter 13, when receiving data from I/O bus 14 and writing data to memory 12, I/O adapter 13 will coalesce data from I/O bus 14 into a full cache line before writing the data to memory 12.

Figure 6:
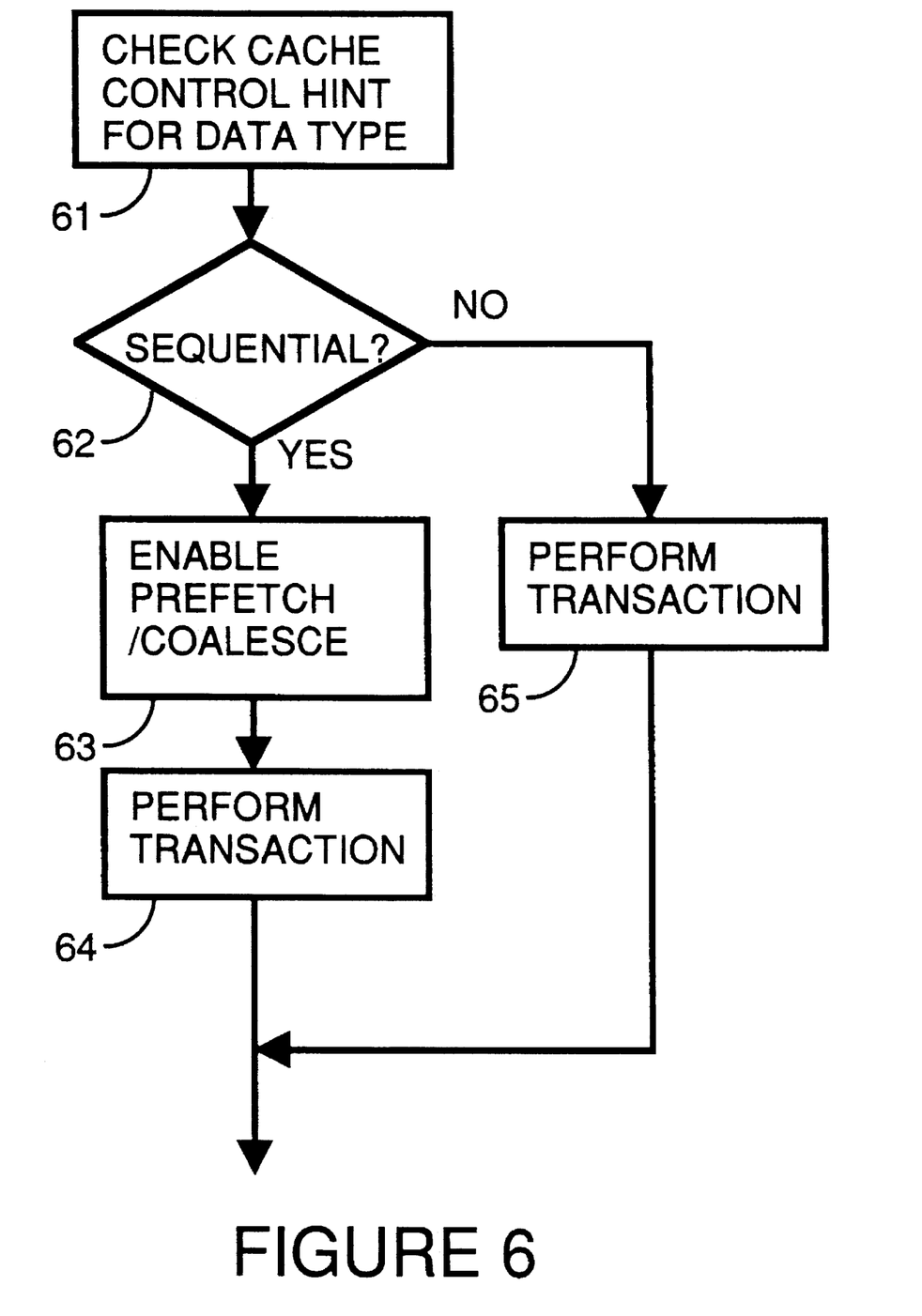
FIG. 6 is a flowchart which demonstrates how a data type indicator in the translation map affects performance of an I/O adapter during a data transaction in accordance with a preferred embodiment of the present invention.

FIG. 6 demonstrates how the first bit in cache control hint field 35 affects performance of I/O adapter 13 on a data transaction. When I/O adapter 13 performs a data transaction, I/O adapter 13, in a step 61 and a step 62, checks cache control hint field 35 to determine whether the first bit of cache control hint field 35 is set to logic one, indicating the data is sequential. If the page is not sequential, in a step 65, the data transaction is performed. If the data is sequential, in a step 63, I/O adapter 13 will enable prefetch (for data read from memory 12) or coalesce (for data to be written to memory 12). In a step 64, the data transaction is performed.

A second bit in cache control hints field 35 indicates how data is to be handled in processor caches, such as cache 17 and cache 18, when I/O adapter moves data in and out of memory 12. For pages in which the second bit in cache control hints field 35 indicates that cache entries are to be invalidated, whenever I/O adapter reads from or writes data to memory 12, corresponding entries in cache 17 and cache 18 are invalidated.

For pages in which the second bit in cache control hints (CC) field 35 indicates that cache entries are to be cleansed/updated, whenever I/O adapter reads data from memory 12, corresponding entries in cache 17 and cache 18 are cleansed and whenever I/O adapter writes data to memory 12, corresponding entries in cache 17 and cache 18 are updated. "Dirty" data in a cache is cleansed by performing a coherent transfer of the data into memory 12.

In another preferred embodiment of the present invention, the second cache control hint bit is ignored by the I/O adapter. In this embodiment, data may be handled in processor caches when I/O adapter moves data in and out of memory 12, by either invalidating cache entries, cleansing/updating cache entries or any combination of these. For example, in the case of a read from a cache line marked clean (i.e., not marked dirty), the cache line is not invalidated even though the second bit in cache control hints field 35 for the page indicates that cache entries are to be invalidated.

Figure 7:
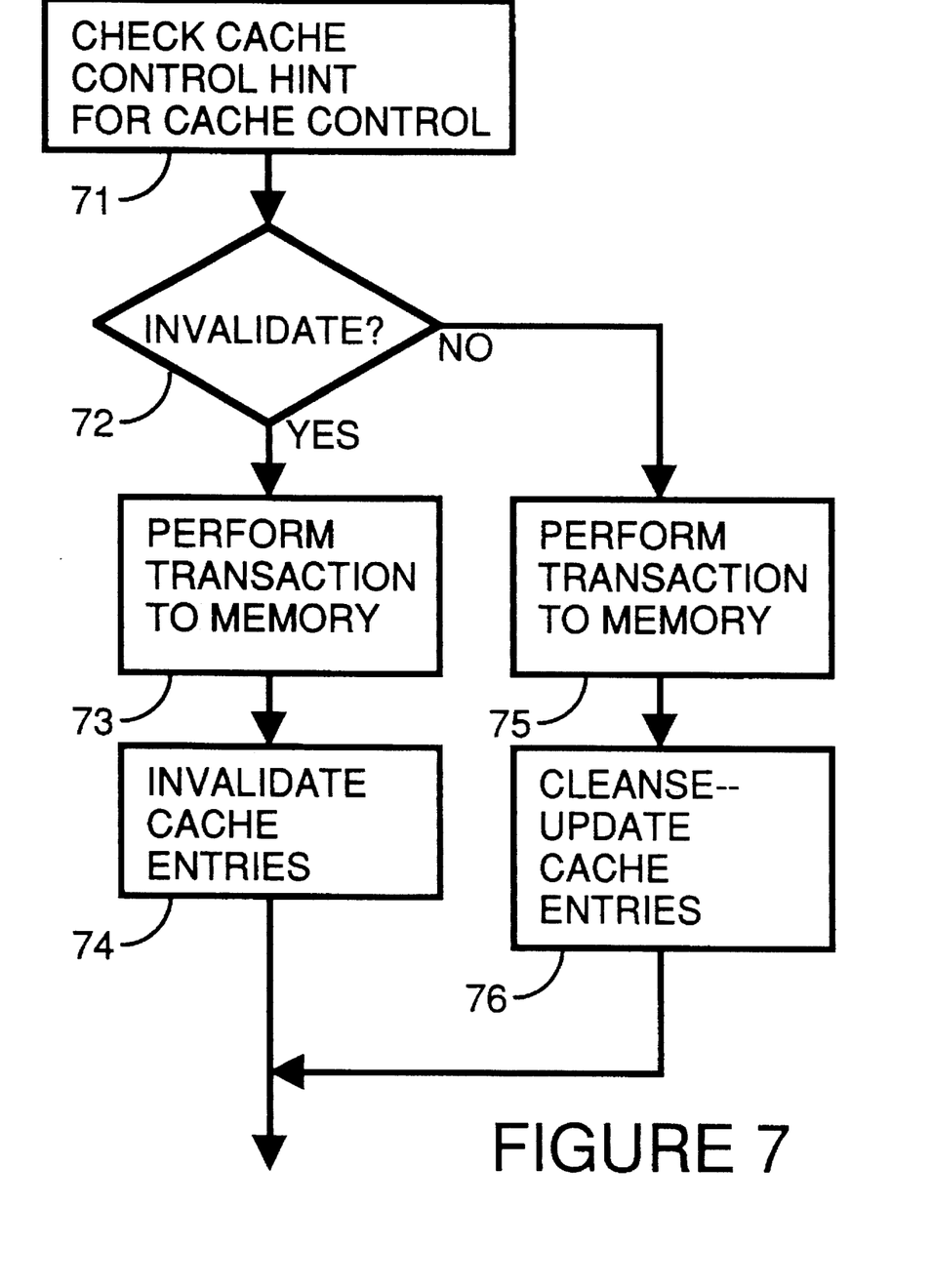
FIG. 7 is a flowchart which demonstrates how a cache control indicator in the translation map affects performance of an I/O adapter during a data transaction in accordance with a preferred embodiment of the present invention.

FIG. 7 demonstrates how the second bit in cache control hint field 35 affects performance of I/O adapter 13 on a data transaction. When I/O adapter 13 performs a data transaction, I/O adapter 13, in a step 71 and a step 72, checks cache control hint field 35 to determine whether the second bit of page type field 37 is cleared to zero, indicating entries in the data caches are to be invalidated. If the entries in the data caches are to be invalidated, in a step 73, the data transaction is performed. In a step 74, corresponding cache entries are invalidated. If the data is not to be invalidated, but instead is to be cleansed (when I/O adapter reads data from memory 12) or updated (when I/O adapter writes data to memory 12), in a step 75, the data transaction is performed. In a step 74, corresponding cache entries are cleansed (when I/O adapter reads data from memory 12) or updated (when I/O adapter writes data to memory 12).

Table 2 below summarizes the cache control hints indicated by cache control hints field 35.

TABLE 2

| Value in field 35 | Cache Control Hints |
| --- | --- |
| 00 | Non-sequential/Invalidate |
| 01 | Non-sequential/Cleanse--Update |
| 10 | Sequential/Invalidate |
| 11 | Sequential/Cleanse--Update |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computing system, comprising:

an interconnect means for providing information transfer;

a main memory coupled to the interconnect means;

an input/output adapter, coupled to the interconnect means, the input/output adapter including a translation map, the translation map mapping input/output page numbers to memory address page numbers, each entry in the translation map including an address of a data page in the main memory and transaction configuration information which is utilized by the input/output adapter during data transactions to and from the data page, wherein the transaction configuration information for each entry includes an indicator indicating whether data within the data page is sequential; and, a processor, coupled to the interconnect means, the processor including a cache and instruction execution means for generating the transaction configuration information and storing the transaction configuration information in the translation map.

2. A computing system, comprising:

an interconnect means for providing information transfer;

a main memory coupled to the interconnect means;

an input/output adapter, coupled to the interconnect means, the input/output adapter including a translation map, the translation map mapping input/output page numbers to memory address page numbers, each entry in the translation map including an address of a data page in the main memory and transaction configuration information which is utilized by the input/output adapter during data transactions to and from the data page, wherein the transaction configuration information for each entry includes an indicator indicating whether data within the data page is aligned along cache line boundaries; and, a processor, coupled to the interconnect means, the processor including a cache and instruction execution means for generating the transaction configuration information and storing the transaction configuration information in the translation map.

3. A computing system, comprising:

an interconnect means for providing information transfer;

a main memory coupled to the interconnect means;

an input/output adapter, coupled to the interconnect means, the input/output adapter including a translation map, the translation map mapping input/output page numbers to memory address page numbers, each entry in the translation map including an address of a data page in the main memory and transaction configuration information which is utilized by the input/output adapter during data transactions to and from the data page, wherein the transaction configuration information for each entry includes an indicator indicating whether the input/output adapter locks out other transactions to main memory when input/output adapter reads data from the data page in main memory and when input/output adapter writes data to the data page in main memory; and, a processor, coupled to the interconnect means, the processor including a cache and instruction execution means for generating the transaction configuration information and storing the transaction configuration information in the translation map.

4. In a computing system which includes a main memory and an input/output adapter, the input/output adapter including a translation map, the translation map mapping input/output page numbers to memory address page numbers, a computer implemented method comprising the step of:

(a) generating entries to the translation map, each entry including an address of a data page in the main memory and transaction configuration information to be utilized by the input/output adapter during data transactions to and from the data page, wherein the transaction configuration information for each entry includes an indicator indicating whether data within the data page is sequential.

5. A method as in claim 4, additionally comprising the steps of:

(b) before the input/output adapter performs a data transaction to the data page, checking the indicator to determine whether data within the data page is sequential; and, (c) when in step (b) it is determined that data within the data page is sequential, performing the following substeps, (c.1) during data writes of data to the data page, coalescing data into cache lines by the input/output adapter, and (c.2) during data reads of data from the data page, prefetching additional data into the input/output adapter.

6. In a computing system which includes a main memory and an input/output adapter, the input/output adapter including a translation map, the translation map mapping input/output page numbers to memory address page numbers, a computer implemented method comprising the step of:

(a) generating entries to the translation map, each entry including an address of a data page in the main memory and transaction configuration information to be utilized by the input/output adapter during data transactions to and from the data page, wherein the transaction configuration information for each entry includes an indicator indicating whether data within the data page is aligned along cache line boundaries.

7. A method as in claim 6, additionally comprising the steps of:

(b) before the input/output adapter performs a DMA data transaction to the data page, checking the indicator to determine whether data within the data page is aligned along cache line boundaries;

(c) when in step (b) it is determined that data within the data page is aligned along cache line boundaries, performing a fast DMA transaction; and, (d) when in step (b) it is determined that data within the data page is not aligned along cache line boundaries, performing a safe DMA transaction.

8. In a computing system which includes a main memory and an input/output adapter, the input/output adapter including a translation map, the translation map mapping input/output page numbers to memory address page numbers, a computer implemented method comprising the step of:

(a) generating entries to the translation map, each entry including an address of a data page in the main memory and transaction configuration information to be utilized by the input/output adapter during data transactions to and from the data page, wherein the transaction configuration information for each entry includes an indicator indicating whether the input/output adapter locks out other transactions to main memory when input/output adapter reads data from the data page in main memory and when input/output adapter writes data to the data page in main memory.

9. A method as in claim 8, additionally comprising the steps of:

(b) before the input/output adapter performs a data transaction to the data page, checking the indicator to determine whether the input/output adapter locks out other transactions to main memory when input/output adapter reads data from the data page in main memory and when input/output adapter writes data to the data page in main memory; and, (c) when in step (b) it is determined that the input/output adapter locks out other transactions to main memory when input/output adapter reads data from the data page in main memory and when input/output adapter writes data to the data page in main memory, locking out other transactions to main memory when input/output adapter reads data from the data page in main memory and when input/output adapter writes data to the data page in main memory.

* * * * *